United States Patent [19]

Labaugh et al.

[11] Patent Number: 4,861,124
[45] Date of Patent: Aug. 29, 1989

[54] DUAL-SECTION SPATIAL MODULATION TRANSMITTER

[75] Inventors: Kenneth D. Labaugh, Milford, N.H.; John D. Kuppenheimer, Jr., Tewksbury, Mass.

[73] Assignee: Sanders Associates, Inc., Nashua, N.H.

[21] Appl. No.: 252,461

[22] Filed: Oct. 3, 1988

Related U.S. Application Data

[63] Continuation-in-part of Ser. No. 49,192, May 13, 1987, abandoned.

[51] Int. Cl.⁴ .............................................. G02B 26/10
[52] U.S. Cl. .................. 350/6.5; 250/503.1; 350/486; 362/35
[58] Field of Search ................. 350/486, 6.5, 6.6, 613, 350/614, 615; 250/503.1; 342/5, 6; 343/761, 762, 763, 775, 780, 781 R, 786; 356/24; 362/35

[56] References Cited

U.S. PATENT DOCUMENTS

| | | | |
|---|---|---|---|
| 2,316,151 | 4/1943 | Barrow | 343/786 |
| 2,412,320 | 12/1946 | Carter | 343/781 |
| 2,416,698 | 3/1947 | King | 343/781 |
| 2,543,130 | 2/1951 | Robertson | |
| 2,591,695 | 4/1952 | Hansen | 343/786 |
| 2,633,533 | 3/1953 | Robinson | 343/786 |
| 2,664,560 | 12/1953 | Lyman et al. | 343/786 |
| 2,721,263 | 10/1955 | Spencer | 343/761 |
| 2,939,141 | 5/1960 | Casabona et al. | 343/786 |
| 3,035,175 | 5/1962 | Christensen | |
| 3,044,067 | 7/1962 | Butson | 343/781 |
| 3,230,535 | 1/1966 | Ferrante et al. | 343/762 |
| 3,793,518 | 2/1974 | Harper | |
| 3,914,055 | 10/1975 | Wolga et al. | 356/301 |
| 4,377,802 | 3/1983 | Ferenc | 362/35 |
| 4,575,863 | 3/1986 | Roberts | |

Primary Examiner—Bruce Y. Arnold
Assistant Examiner—Terry S. Callaghan
Attorney, Agent, or Firm—Richard I. Seligman; Stanton D. Weinstein

[57] ABSTRACT

A dual-section spatial modulator transmitter consists of a collector surrounding a source of radiation to collect the energy from the source and form it into multiple beams. The collector is configured in two sections, a rotatable section and a stationary section such that spatial modulation is obtained by rotating only the rotatable section.

6 Claims, 1 Drawing Sheet

DUAL-SECTION SPATIAL MODULATION TRANSMITTER

CROSS-REFERENCE TO RELATED APPLICATION

This is a continuation-in-part of application Ser. No. 049,192, filed May 13, 1987 now abandoned.

BACKGROUND OF THE INVENTION

This invention relates to spatial modulation of infrared sources and, more particularly, to spatial modulators in which a portion of the beam forming optics is rotated and another portion is stationary.

Spatial modulators are used to collect radiation emitted from a source and generate rotating beams. Such modulators often comprise reflective optics. The reflective optics typically surround a source of radiation, collect the radiation from the source and form it into distinct beams. Modulation is achieved by rotating the beamforming optics.

Typically each section of reflective optics which creates a single beam has a cross section conforming to a portion of a parabola which has the source of radiation at its focus. The reflective optics are typically elongated in the vertical direction (along the longitudinal or major axis of an elongated radiation source) to provide a wide beam in elevation.

Spatial modulators of this type are employed in aircraft as a countermeasure against heat seeking missiles. In order to effectively countermeasure a heat seeking missile, it is necessary that the radiant intensity of the beam be high. To accomplish this, the reflective optics must collect the maximum amount of radiation emitted from the source. Because of the wide elevation angle of the beams, the average intensity at any one point in the beam is much less than that which could be obtained with beams of smaller elevation angles.

Another difficulty of designing such a system is that of preserving the projected area-solid angle product (étendue) of the source at the output of the collector. This insures the maximum radiant intensity in the far field which can be gotten within the angles of desired coverage from the given source.

Another one of the problems associated with this type of system is the size of the motors necessary to rotate the relatively large and heavy reflective optics.

Applications have now arisen where ships also require protection against heat seeking missiles. These missiles generally approach the ship just above the waterline and, thus, the countermeasuring beams do not need to have a wide elevation angle.

SUMMARY OF THE INVENTION

Accordingly, it is an object of this invention to provide an improved spatial modulation transmitter.

It is another object of this invention to provide a spatial modulation transmitter generating high radiant intensity beams with relatively narrow elevation angles.

It is a further object of this invention to provide a spatial modulation transmitter with less mass to rotate and, thus, requiring reduced sized motors to rotate the reflective optics.

It is another object of this invention to provide a spatial modulator which substantially preserves étendue to ensure maximum system radiant intensity.

Briefly, a spatial modulation transmitter is provided which includes first and second reflective optics to collect the energy from a source of infrared radiation and form it into beams. The source of infrared energy is typically a cylindrically shaped electrically heated source arranged such that the longitudinal or major axis of the source is parallel to the azimuthal direction of the beams and orthogonal to the axis of rotation of the reflective optics. Since the major axis of the source is arranged parallel to the azimuthal direction of the beam, all of the energy emitted from the source can be collected and formed into a beam having a relatively small elevation angle.

The reflective collection and beamforming optics are configured in two sections, a rotating section and a stationary section. The rotating section immediately surrounds the source and includes a portion for defining the shape of the beams in azimuth and another portion for shaping the beam in elevation. The stationary section is shaped like a pair of facing pie dishes with holes in their centers and arranged above and below the rotating section and defines the limits of the beam in elevation. These reflective collectors are designed to substantially preserve the source étendue.

Since a portion of the reflective optics is stationary, the mass of the remaining or rotating portion is reduced and less motor power is required to rotate the rest of the reflective optics about the source of radiation.

Also, since the major axis of the source is arranged orthogonal to the axis of rotation, a relatively large source can be employed even though the elevation angle defined by the reflectory optics is minimized. Thus, large jamming signals can be generated.

BRIEF DESCRIPTION OF THE DRAWINGS

The above-mentioned and other features and objects of this invention will become more apparent by reference to the following description taken in conjunction with the accompanying drawings, in which.

DESCRIPTION OF A PREFERRED EMBODIMENT

As mentioned hereinbefore the object of this invention is to provide a transmitter for generating a plurality of high intensity rotating beams with relatively narrow elevation angles. The beams are formed by reflective optics which collect radiation from a source and appropriately shape it. These reflective collectors are designed to substantially preserve the source étendue. In order to minimize the motor power required to rotate the optics, a portion of the reflective optics is stationary and, therefore, only a portion of the reflective optics need be rotated.

Figure 1:
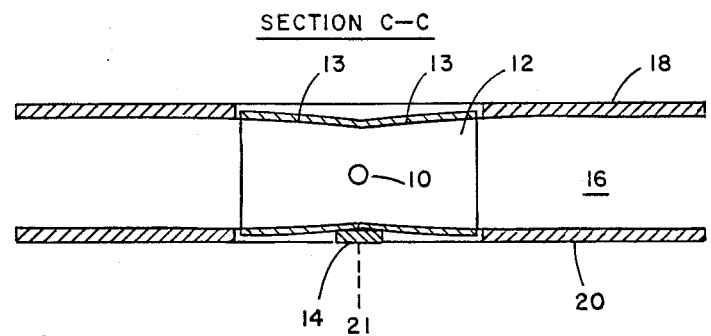
FIG. 1 is a side view of a transmitter employing a dual-section modulator.
Figure 2:
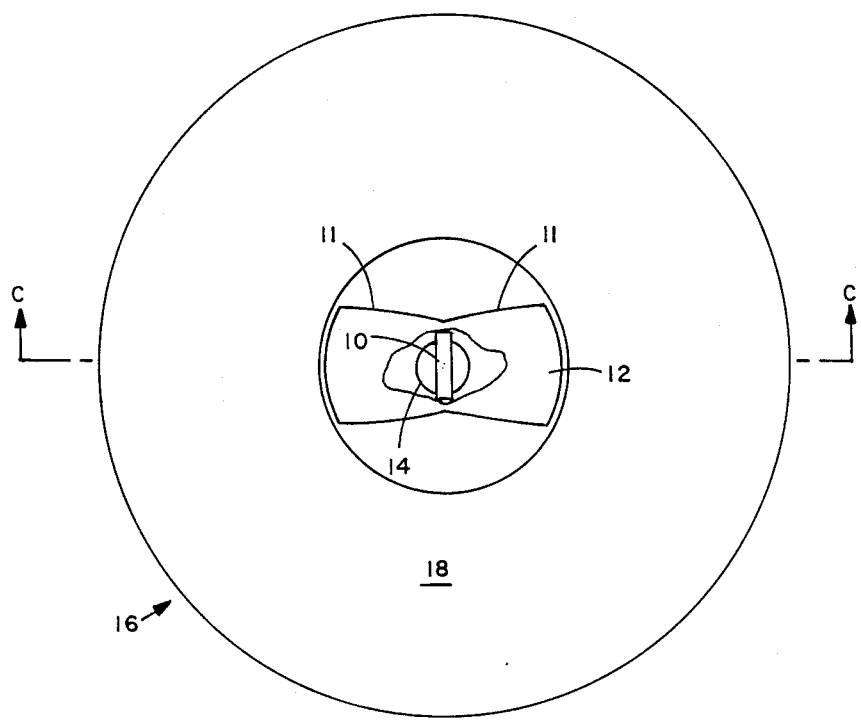
FIG. 2 is a top view of the transmitter of FIG. 1.
Figure 3:
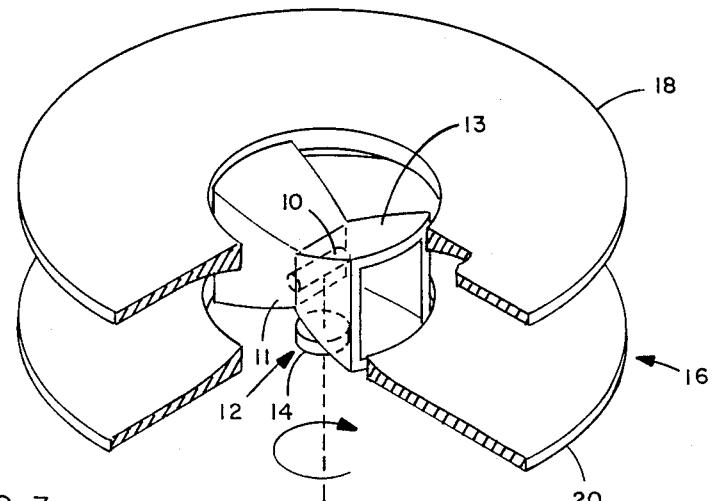
FIG. 3 is a perspective view of the modulator shown in FIGS. 1 and 2.

A sectional view of the transmitter is illustrated in FIG. 1, a top view thereof is illustrated in FIG. 2 and a perspective view of the modulator of FIGS. 1 and 2 is illustrated in FIG. 3. The radiation to be modulated is typically generated from an electrically heated rod of silicon carbide 10. However, any source which emits a substantial amount of infrared radiation is suitable. For purposes of clarity, the means to heat rod 10 is omitted since it forms no part of the present invention. The rod is placed within a rotating collector 12 which forms it into two beams 180° apart from each other. The "azimuthal portion" of collector 12 is preferably configured as two compound parabolas and the elevation portion 13 as two parabolas. A motor 14, shown schematically, is employed to rotate the collector 12 so as to provide 360° of azimuthal coverage. Using only collector 12, the beams generated thereby will be relatively wide in elevation. For certain applications this is unnecessary as only narrow elevation coverage is required, therefore, the average power in any one part of the beam is reduced. One way of narrowing elevation beam width is to extend the length of the collector 12.

This will make collector 12 much heavier and, thus, motor 14 must be more powerful. This is wasteful of energy. Instead, to narrow the beam in elevation, a second collector 16 is provided. Collector 16 is formed of upper and low sections 18 and 20 which together in effect extend the length of collector 12. As shown, collector 16 is stationary and narrows the beam in elevation without necessity for rotating this collector. Therefore, no additional motor power is required. Thus, the beam is narrowed in elevation without requiring a larger rotating collector necessitating a larger motor and, further, the average intensity of the beam is increased since all of the radiation from the source is condensed into a smaller beam (in elevation).

One additional change from prior art systems is the position of source 10 Conventionally, the major axis of source 10 is positioned parallel to the axis of rotation of the rotating reflective optics. In this embodiment the major axis of source 30 is located orthogonal to the axis of rotation. This provides a better match to the reflector optics which is wider in azimuth than in elevation.

While we have described above the principles of our invention in connection with specific apparatus, it is to be clearly understood that this description is made only by way of example and not as a limitation of the scope of our invention as set forth in the accompanying claims.

We claim:

1. A spatial modulation transmitter, comprising:
    a source of incoherent radiation;
    at least one étendue preserving rotatable collector to collect the radiation emitted by said source of incoherent radiation and form at least one beam;
    said source of incoherent radiation being arranged within said étendue preserving rotatable collector so as to allow said rotatable collector to collect substantially all of the radiation emitted from the source;
    said rotatable collector configured so as to separately shape said beam in azimuth and in elevation;
    means for rotating said collector so as to scan the beam spatially; and
    a stationary collector arranged above and below said rotatable collector and so disposed so as to preserve étendue and further shape the beam, said stationary collector extending beyond the rotatable collector so as to limit the angular extent of the beam.

2. A spatial modulation transmitter as defined in claim 1, wherein said source of radiation is longer than wide and disposed with respect to said rotatable collector such that the major axis of the source is parallel to the azimuthal direction of the beam.

3. A spatial modulation transmitter as defined in claim 1, wherein said stationary collector includes a first plate disposed above said rotatable collector and a second plate disposed below said rotatable collector.

4. A spatial modulation transmitter as defined in claim 3, wherein said first and second plates have holes in the centers thereof.

5. A spatial modulation transmitter as defined in claim 1, wherein said source of incoherent radiation comprises a source of incoherent optical radiation.

6. A spatial modulation transmitter as defined in claim 1, wherein said source of incoherent radiation comprises as infrared source.

* * * * *